(12) United States Patent
Tsujimoto et al.

(10) Patent No.: US 12,484,759 B2
(45) Date of Patent: Dec. 2, 2025

(54) MEDICAL IMAGING APPARATUS AND OPERATING METHOD FOR SAME

(71) Applicant: FUJIFILM Corporation, Tokyo (JP)

(72) Inventors: Takayuki Tsujimoto, Kanagawa (JP); Masaaki Oosake, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 265 days.

(21) Appl. No.: 18/185,833

(22) Filed: Mar. 17, 2023

(65) Prior Publication Data

US 2023/0210349 A1 Jul. 6, 2023

Related U.S. Application Data

(63) Continuation of application No. PCT/JP2021/034569, filed on Sep. 21, 2021.

(30) Foreign Application Priority Data

Sep. 24, 2020 (JP) .................. 2020-159622

(51) Int. Cl.
*A61B 1/00* (2006.01)

(52) U.S. Cl.
CPC .... *A61B 1/000096* (2022.02); *A61B 1/00045* (2013.01)

(58) Field of Classification Search
CPC .......... A61B 1/000096; A61B 1/00045; A61B 1/0638; A61B 1/000094; A61B 1/000095
USPC ........................................................ 328/128
See application file for complete search history.

(56) References Cited

U.S. PATENT DOCUMENTS

| | | | |
|---|---|---|---|
| 2012/0163694 A1* | 6/2012 | Wiemker | G06T 7/70 382/131 |
| 2019/0311476 A1 | 10/2019 | Hayami et al. | |
| 2021/0153730 A1 | 5/2021 | Karino | |
| 2021/0177248 A1 | 6/2021 | Usuda | |

FOREIGN PATENT DOCUMENTS

| | | |
|---|---|---|
| WO | 2018/105063 A1 | 6/2018 |
| WO | 2019/087791 A1 | 5/2019 |
| WO | 2019/123986 A1 | 6/2019 |
| WO | 2020/036121 A1 | 2/2020 |
| WO | 2020/036224 A1 | 2/2020 |
| WO | 2020/054543 A1 | 3/2020 |

OTHER PUBLICATIONS

International Search Report issued in PCT/JP2021/034569; mailed Dec. 14, 2021.

(Continued)

*Primary Examiner* — Stephen P Coleman
(74) *Attorney, Agent, or Firm* — Studebaker Brackett PLLC (57) ABSTRACT

An image acquisition unit sequentially acquires a medical image. A recognition processing unit applies a recognition process to the medical image. A recognition result display determination unit determines to display or not display the result of the recognition process on a display according to blur in the medical image. A display control unit controls the display of the recognition process according to the determination by the recognition result display determination unit.

9 Claims, 7 Drawing Sheets

(56) References Cited

OTHER PUBLICATIONS

International Preliminary Report on Patentability (Chapter I) and Written Opinion of the International Searching Authority issued in PCT/JP2021/034569; issued Mar. 28, 2023.
An Office Action; "Notice of Reasons for Refusal," mailed by the Japanese Patent Office on Dec. 12, 2023, which corresponds to Japanese Patent Application No. 2022-551994 and is related to U.S. Appl. No. 18/185,833; with English language translation.

* cited by examiner

MEDICAL IMAGING APPARATUS AND OPERATING METHOD FOR SAME

CROSS-REFERENCE TO RELATED APPLICATIONS

This application is a Continuation of PCT International Application No. PCT/JP2021/034569 filed on 21 Sep. 2021, which claims priority under 35 U.S.C § 119 (a) to Japanese Patent Application No. 2020-159622 filed on 24 Sep. 2020. The above application is hereby expressly incorporated by reference, in its entirety, into the present application.

BACKGROUND OF THE INVENTION

1. Field of the Invention

The present invention relates to a medical imaging apparatus and an operating method for the same, in which an artificial intelligence (AI) or other recognition process is used.

2. Description of the Related Art

Medical imaging systems that use medical images, such as endoscope systems provided with a light source device, an endoscope, and a processor device, are widespread in the current medical field. Moreover, in recent years, functions for detecting a region of interest from a medical image such as an endoscope image using an artificial intelligence (AI) or other recognition process and diagnostic support functions for performing differential classification or segmentation of a lesion are increasingly being used. For example, WO2018/105063A indicates that image processing is used to perform differential classification of a lesion.

SUMMARY OF THE INVENTION

In endoscopic diagnosis, body tissues such as the large intestine are not stationary, and it is difficult to keep the tip part of the endoscope at a fixed distance from a lesion. For this reason, even if the same lesion is captured successively, there will be more than a few images in which the lesion is clearly visible and more than a few images in which the lesion is blurry. It is highly expected to obtain a correct result of a recognition process from an image that has been captured clearly. On the other hand, since it is difficult to ascertain the surface structure of a lesion from a blurry image, it is weakly expected that a correct result of a recognition process will be obtained, and such an image may impede diagnosis by a physician. In this regard, in WO2018/105063A, the tip part of an endoscope is determined to be in a differentiating state or not according to whether the tip part is in a stationary state or not, but a relationship between image blur and the differentiating state is not described or suggested.

An objective of the present invention is to provide a medical imaging apparatus and an operating method for the same, in which the result of a recognition process can be displayed appropriately according to the state of image blur.

A medical imaging apparatus of the present invention includes a processor that sequentially acquires a medical image, applies a recognition process to the medical image, determines to display or not display a result of the recognition process on a display according to blur in the medical image, and controls the display of the recognition process according to the determination.

The processor preferably acquires intermediate image features from the time the recognition process is applied to the medical image until the result of the recognition process is obtained, performs a pattern classification process that classifies patterns of the intermediate image features, and determines to display or not display the result of the recognition process on the basis of a result of the pattern classification process. The recognition process preferably is a convolutional neural network (CNN). The pattern classification process preferably is a support vector machine (SVM).

The processor preferably performs a pixel gradient calculation process that calculates pixel gradients from the medical image, calculates a representative value of the pixel gradients, and determines to display or not display the result of the recognition process on the basis of the representative value. The pixel gradient calculation process preferably is any of a Sobel filter, a Laplacian filter, a Log filter, a LoG filter, or a Canny filter. The representative value preferably is the sum or the mean of the pixel gradients in the medical image.

The medical image preferably is an endoscope image obtained through image pick-up by an endoscope inside the body. The processor preferably acquires, as the medical image, the endoscope image from an endoscope processor device that processes the endoscope image.

An operating method for a medical imaging apparatus of the present invention includes steps, executing by a processor, of sequentially acquiring a medical image, applying a recognition process to the medical image, determining to display or not display a result of the recognition process on a display according to blur in the medical image, and controlling the display of the recognition process according to the determination.

According to the present invention, the result of the recognition process can be displayed appropriately according to the state of image blur.

DESCRIPTION OF THE PREFERRED EMBODIMENTS

First Embodiment

Figure 1:
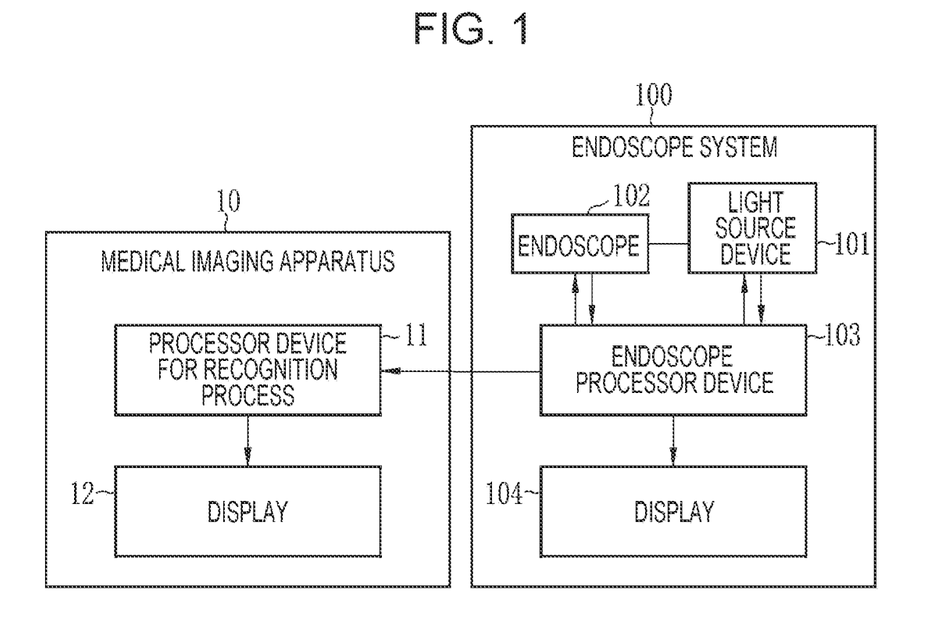
FIG. 1 is a block diagram illustrating functions of a medical imaging apparatus and an endoscope system.

As illustrated in FIG. 1, a medical imaging apparatus 10 according to a first embodiment applies a recognition process such as lesion detection or differentiation to a medical image such as an endoscope image, and display a result of the recognition process. The medical imaging apparatus 10 is connected to an endoscope system 100 that acquires an endoscope image obtained by capturing an image inside the body, such as in the alimentary canal.

The endoscope system 100 includes a light source device 101, an endoscope 102, an endoscope processor device 103, and a display 104. The light source device 101 supplies the endoscope 102 with illumination light for irradiating the inside of a photographic subject. The endoscope 102 acquires an endoscope image by capturing an image of the photographic subject irradiated by at least one of light in the white wavelength range or light in a specific wavelength range. The light in the specific wavelength range that the endoscope 102 uses for the illumination light is, for example, light in a shorter wavelength range than the green wavelength range, in particular, light in the blue range or the purple range of the visible range.

The endoscope processor device 103 sequentially acquires an endoscope image from the endoscope 102 and applies various types of image processing to the acquired endoscope image. The endoscope image with the various types of image processing applied is displayed on the display 104. Also, the endoscope image before or after applying the various types of image processing is transmitted from the endoscope processor device 103 to the medical imaging apparatus 10 for a lesion recognition process.

Note that the medical image is a still image or a motion picture (also referred to as an inspection motion picture). In the case in which the medical image is a motion picture, a frame image included in the motion picture can be acquired as a still image after inspection. Also, in the case in which the medical image is a motion picture, displaying the medical image include not only displaying a still image of a single representative frame included in the motion picture, but also playing back the motion picture one or multiple times. Moreover, the medical image includes not only an image captured in accordance with a physician operating the endoscope 102 and the like, but also an image picked up automatically without a capture instruction from the physician.

In the case in which the medical imaging apparatus 10 may acquire multiple medical images, one or multiple medical images from among the medical images can be acquired selectively. Moreover, the medical imaging apparatus 10 can acquire multiple medical images acquired in multiple, mutually different inspections. For example, one or both of a medical image acquired in an inspection conducted in the past and a medical image acquired in the most recent inspection can be acquired. That is, the medical imaging apparatus can acquire any medical images.

The medical imaging apparatus 10 includes a processor device 11 for the recognition process and a display 12. Note that the display 12 is provided separately from the display 104 of the endoscope system 100, but the display 12 may be omitted from the medical imaging apparatus 10 and the display 104 may be used for both.

Figure 2:
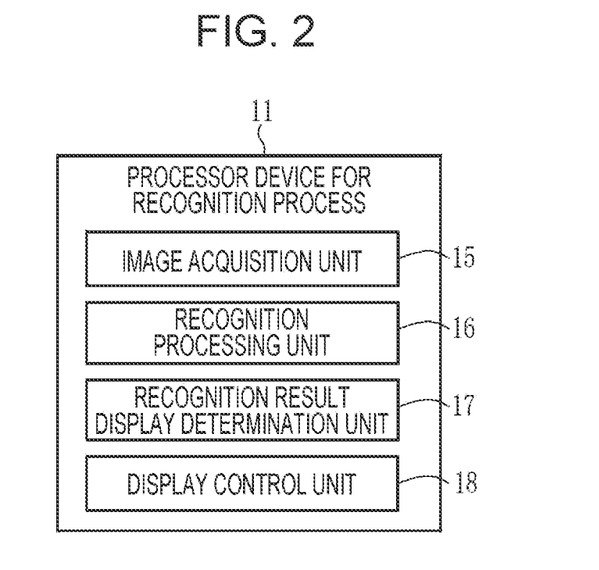
FIG. 2 is a block diagram illustrating functions of a processor device for a recognition process.

The processor device 11 for the recognition process acquires a medical image from the endoscope system 100 and applies the recognition process to the medical image. As illustrated in FIG. 2, the processor device 11 for the recognition process includes an image acquisition unit 15, a recognition processing unit 16, a recognition result display determination unit 17, and a display control unit 18. The image acquisition unit 15 sequentially acquires a medical image transmitted from the endoscope processor device 103 of the endoscope system 100.

In the processor device 11 for the recognition process, programs pertaining to various processes are incorporated into a program memory (not illustrated). A central control unit (not illustrated) formed by a processor is provided in the processor device 11 for the recognition process. The central control unit executes a program in the program memory, thereby achieving the functions of the image acquisition unit 15, recognition processing unit 16, recognition result display determination unit 17, and display control unit 18.

The recognition processing unit 16 applies the recognition process to the medical image. The recognition process includes a region detection process that detects a region of interest ROI, such as a lesion, from the medical image and a region of interest ROI differentiation process that differentiates the type, stage, and the like of a lesion. The recognition result display determination unit 17 determines to display or not display the result of the recognition process on the display 12 according to blur in the medical image. Details regarding the recognition result display determination unit 17 will be described later. The display control unit 18 controls the display of the recognition process according to the determination by the recognition result display determination unit 17. Note that the differentiation process may be performed by segmentation on the entire image or by performing a classification process on only a region detected as a lesion. Moreover, blur in the medical image includes blur caused by blurring of the endoscope, blur caused by movements of the body such as the large intestine, and the like.

Figure 3:
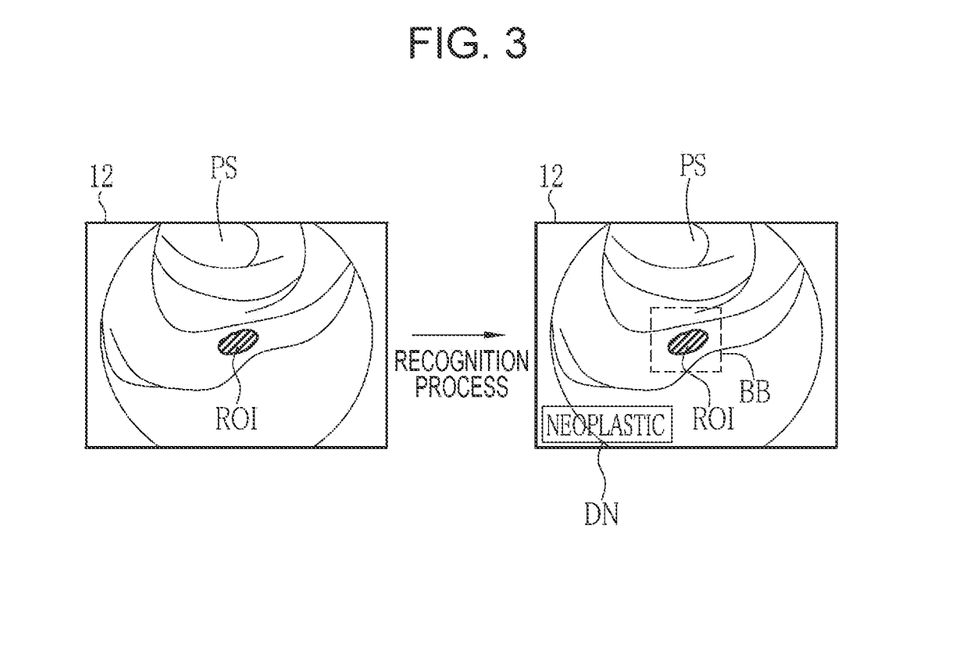
FIG. 3 is an explanatory diagram illustrating a recognition process.

In the case in which the result of the recognition process is determined to be displayed on the display 12, as illustrated in FIG. 3, by performing a recognition process on a medical image PS including the region of interest ROI, a bounding box BB indicating that the region of interest ROI has been detected is displayed as a region detection result and the disease name DN (neoplastic) of a lesion indicated by the region of interest ROI is displayed as a differentiation result on the display 12.

The recognition process in the present embodiment preferably is a process for machine learning used in a learning model trained by machine learning. The process for machine learning preferably is a process using, besides a convolutional neural network (CNN), a neural network (NN), AdaBoost, or random forests. That is, the recognition process preferably outputs, in response to the input of a medical image, a region detection result and/or a differentiation result. Also, region of interest detection may be performed as the recognition process, on the basis of features obtained as color information, gradients of pixel values, and the like in the medical image. Note that changes are expressed in the gradients of pixel values and the like depending on, for example, the shape of the photographic subject (such as global undulation or local depression or elevation of the mucosa), color (colors such as inflammation, bleeding, redness, or whitening due to atrophy), tissue characteristics (such as vessel thickness, depth, density, or a combination thereof), or structural features (such as pit patterns).

Note that region of interests detected by the recognition process are regions including, for example, lesions as typified by cancer, treatment marks, surgical marks, bleeding areas, benign tumor areas, inflammation areas (including areas with changes such as bleeding or atrophy besides so-called inflammation), cauterization marks due to heating, marking areas marked by coloring using a coloring agent, fluorescent agent, or the like, or biopsy areas where a biological test (also referred to as a biopsy) has been performed. In other words, regions of interest may be regions that include a lesion, regions where there is a possibility of a lesion, regions that have undergone some kind of treatment such as a biopsy, regions where there is a treatment tool such as a clip or a forcep, or regions that require detailed observation regardless of the possibility of a lesion such as dark regions (regions behind the folds (rugae) or deep in the lumen that are hard to reach with observation light). The recognition process detects, as a region of interest, a region including at least one of a lesion, treatment mark, surgical mark, bleeding area, benign tumor area, inflammation area, marking area, or biopsy area.

The recognition result display determination unit 17 determines to display or not display the result of the recognition process on the display 12 according to blur in the medical image. This allows for the display or non-display of the result of the recognition process to be controlled, since the result of the recognition process may be inaccurate in some cases, depending on the blur in the medical image. For example, in FIG. 3, if there is little blur in a medical image PS, the correct answer "neoplastic" is obtained as the result of the recognition process, and therefore the result "neoplastic" of the recognition process is displayed in this case. On the other hand, if there is much blur in the medical image PS and the region of interest ROI is indistinct or the like, the incorrect answer "hyperplastic" is obtained as the result of the recognition process. In this case, displaying the incorrect answer "hyperplastic" as-is on the display 12 will supply incorrect information to the user. Accordingly, in the present embodiment, the result of the recognition process is displayed or not displayed according to blur in the medical image.

Figure 4:
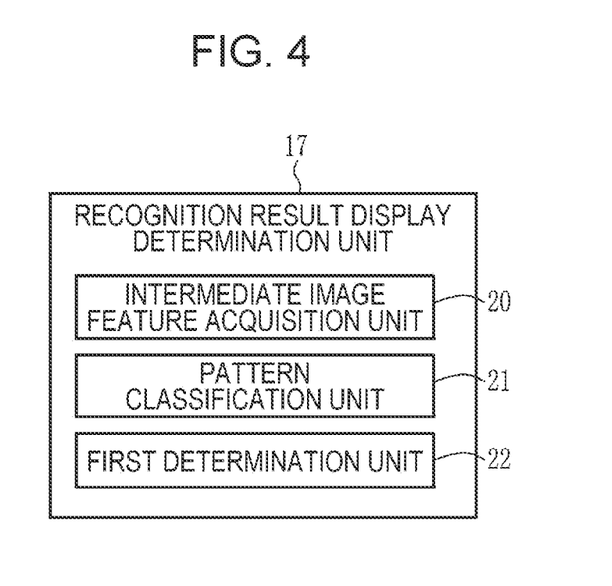
FIG. 4 is a block diagram illustrating functions of a recognition result display determination unit according to a first embodiment.
Figure 5:
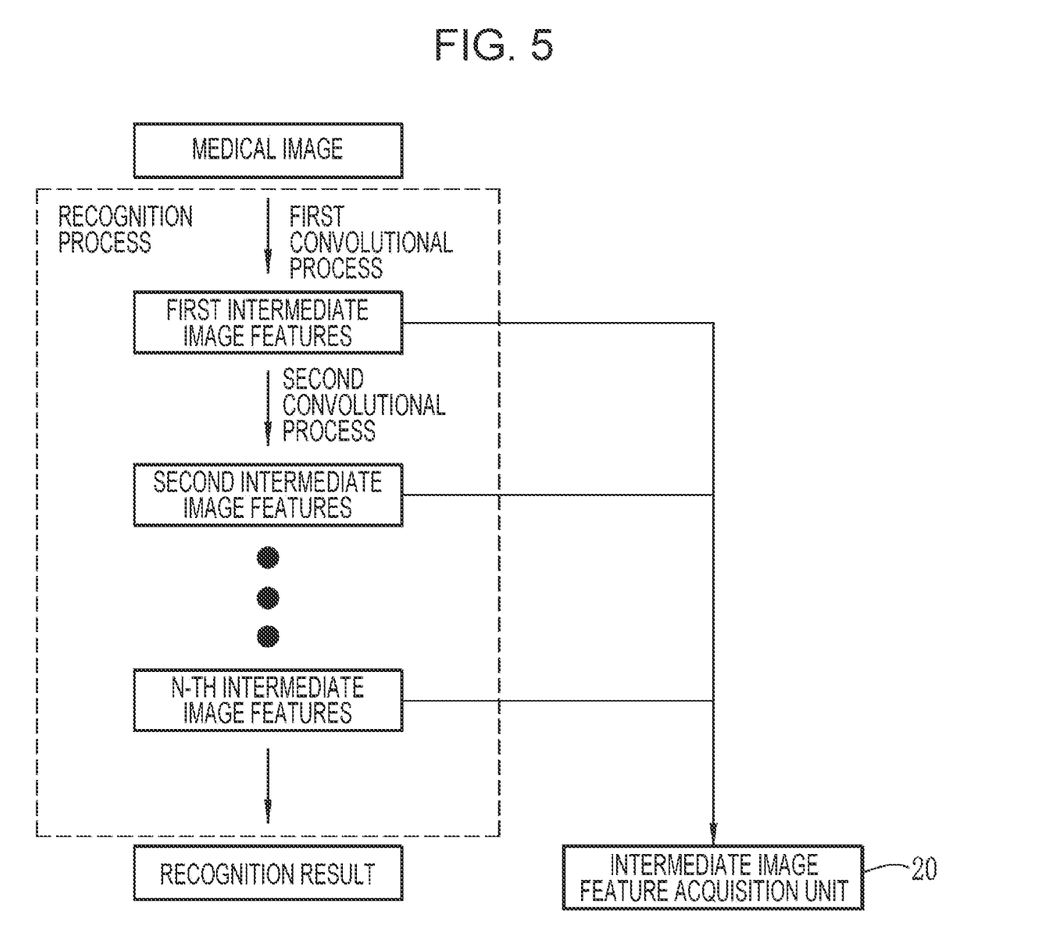
FIG. 5 is an explanatory diagram illustrating details of a recognition process and first to N-th intermediate image features.

As illustrated in FIG. 4, the recognition result display determination unit 17 includes an intermediate image feature acquisition unit 20, a pattern classification unit 21, and a first determination unit 22. The intermediate image feature acquisition unit 20 acquires intermediate image features from the time the recognition process is applied to the medical image until the result of the recognition process is obtained. As illustrated in FIG. 5, in the case where the recognition process is a convolutional neural network (CNN), multiple convolutional processes, such as a first convolutional process, a second convolution process, and so on to an N-th convolutional process (N is a natural number), are executed in the recognition processing unit 16. For example, in the first convolutional process, a convolutional process based on a specific kernel is performed on a medical image with X1 vertical pixels and Y1 horizontal pixels to thereby obtain first intermediate image features with X2 (<X1) vertical pixels and Y2 (<Y1) horizontal pixels. In the second convolutional process, a convolutional process based on a specific kernel is performed on the first intermediate image features to thereby obtain second intermediate image features with X3 (<X2) vertical pixels and Y3 (<Y2) horizontal pixels.

First to N-th intermediate image features are calculated by proceeding in a similar manner up to the N-th convolutional process. In the recognition processing unit 16, the result of the recognition process is outputted on the basis of the N-th intermediate image features. The intermediate image feature acquisition unit 20 acquires, as the intermediate image features, any of the first to N-th intermediate image features or combined features obtained by applying a weighting operation to the first to N-th intermediate image features.

Figure 6:
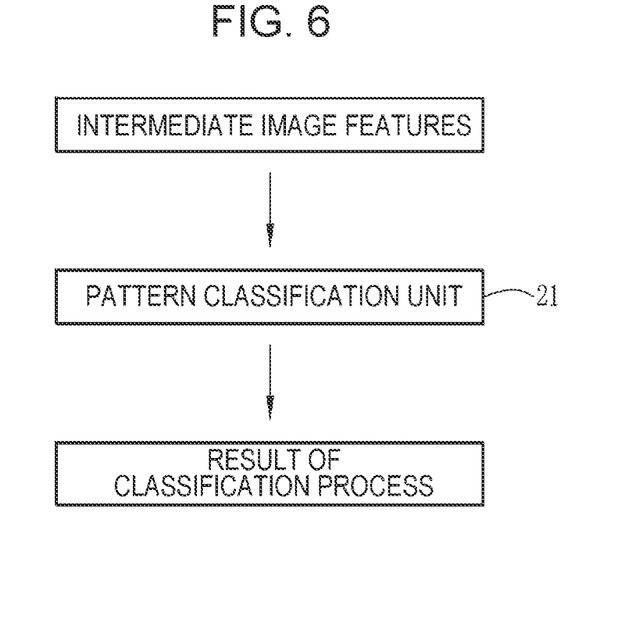
FIG. 6 is a block diagram illustrating functions of a pattern classification unit.

As illustrated in FIG. 6, the pattern classification unit 21 performs a pattern classification process that classifies patterns of the intermediate image features. For the pattern classification process, for example, a support vector machine (SVM) preferably is used. From the pattern classification process, a result of the classification process is obtained, the result including two patterns of the intermediate image features, namely a pattern indicating the characteristics of image blur and a pattern not indicating the characteristics of image blur.

Figure 7:
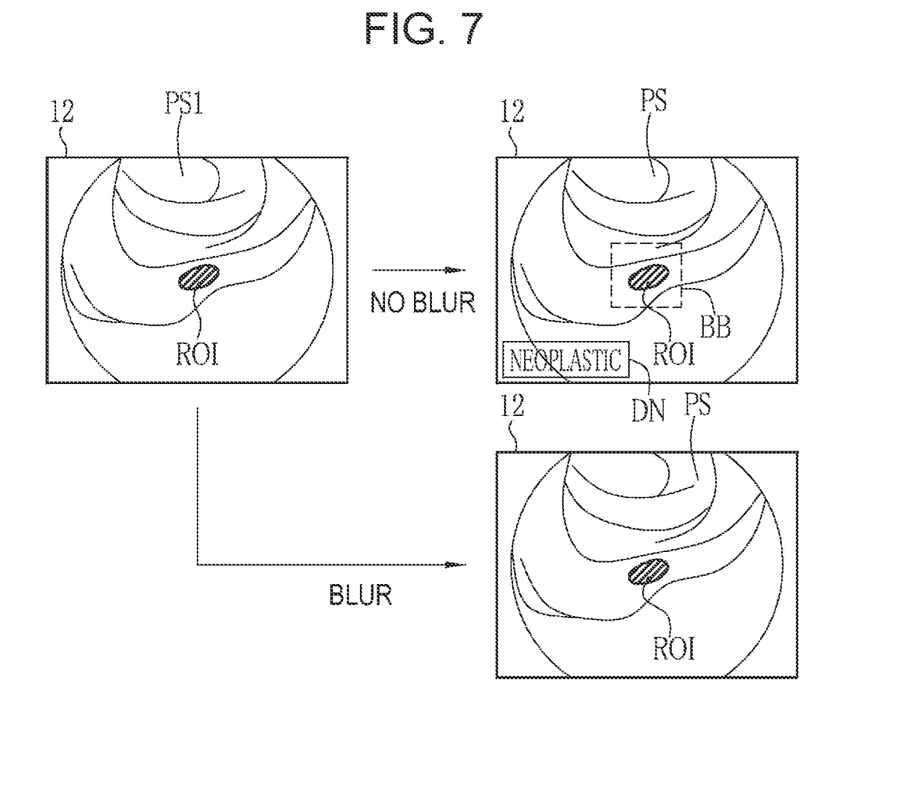
FIG. 7 is an explanatory diagram illustrating display control of a result of a recognition process in the first embodiment.

The first determination unit 22 determines to display or not display the result of the recognition process on the basis of the result of the classification process. As illustrated in FIG. 7, if the intermediate features in the pattern indicating the characteristics of image blur are less than a first feature threshold, or if the intermediate features in the pattern not indicating the characteristics of image blur are equal to or greater than a second feature threshold, the first determination unit 22 determines that there is no blur, and the display control unit 18 displays, on the display 12, the bounding box BB which is the result of the recognition process and/or the disease name DN of a lesion which is the differentiation result. On the other hand, if the intermediate features in the pattern indicating the characteristics of image blur are equal to or greater than the first feature threshold, or if the intermediate features in the pattern not indicating the characteristics of image blur are less than the second feature threshold, the first determination unit 22 determines that there is blur, and the display control unit 18 does not display the bounding box BB and/or the disease name DN of a lesion. Note that in both the case of displaying and the case of not displaying the result of the recognition process, it is preferable to display the original medical image on which the recognition process was performed.

Figure 8:
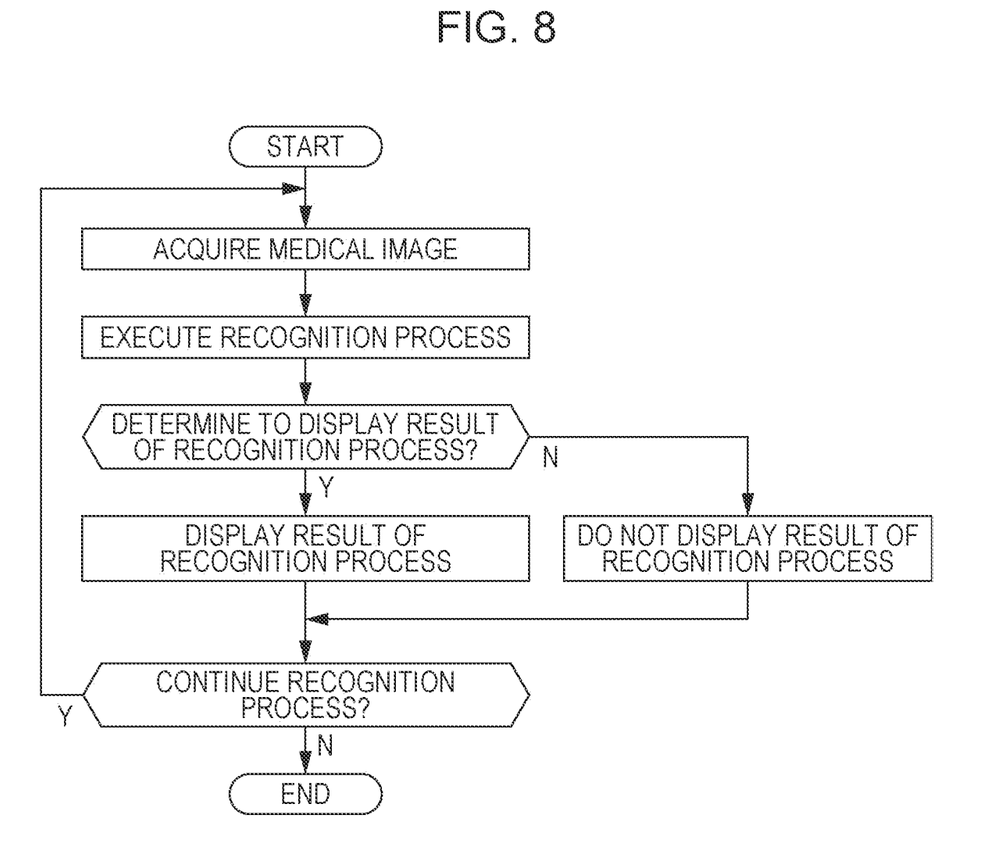
FIG. 8 is a flowchart related to display control of a result of a recognition process.

Next, a series of steps for controlling the display of the result of the recognition process according to blue in the medical image will be described by following the flowchart illustrated in FIG. 8. The image acquisition unit 15 sequentially acquires a medical image from the endoscope processor device 103. The recognition processing unit 16 applies the recognition process to the medical image. The recognition result display determination unit 17 determines to display or not display the result of the recognition process on the display 12 according to blur in the medical image. In the case of determining to display the result of the recognition process in the recognition result display determination unit 17, the result of the recognition process is displayed on the display 12. On the other hand, in the case of determining to not display the result of the recognition process in the recognition result display determination unit 17, the result of the recognition process is not displayed on the display 12. With this arrangement, if the result of the recognition process is incorrect due to blur in the image, the result of the recognition process is not displayed on the display 12 so as to avoid supplying incorrect information to the user. Note that the display control of the result of the recognition process is repeated while the execution of the recognition process is ongoing.

Second Embodiment

In a second embodiment, pixel gradients and the like in the medical image are used to control the display of the result of the recognition process. Portions other than those relating to the display of the result of the recognition process are similar to the first embodiment and therefore omitted.

Figure 9:
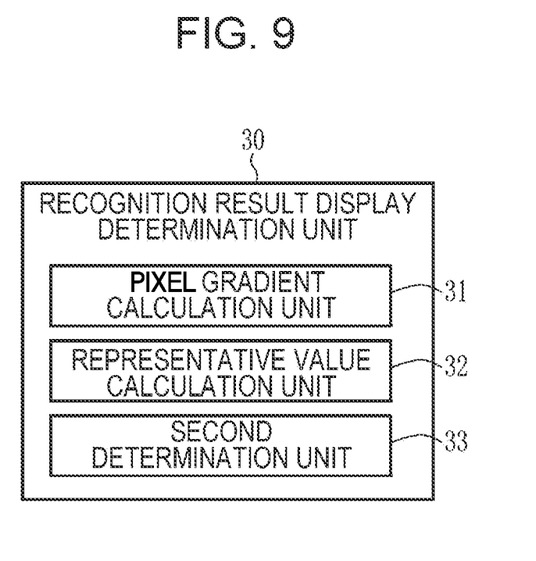
FIG. 9 is a block diagram illustrating functions of a recognition result display determination unit according to a second embodiment.

In the second embodiment, a recognition result display determination unit 30 different from the recognition result display determination unit 17 of the first embodiment is provided in the processor device 11 for the recognition process. As illustrated in FIG. 9, the recognition result display determination unit 30 includes a pixel gradient calculation unit 31, a representative value calculation unit 32, and a second determination unit 33.

Figure 10:
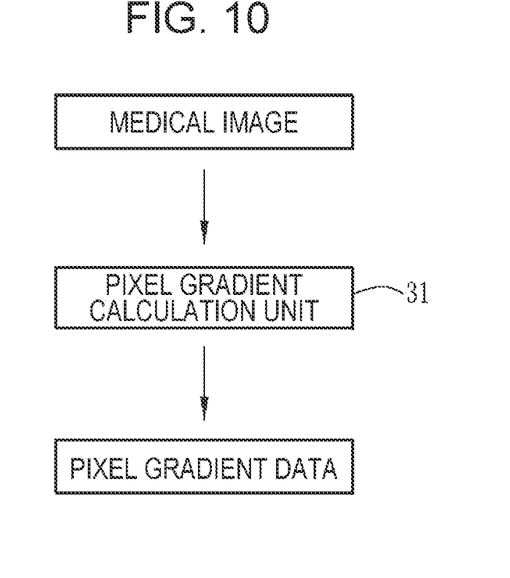
FIG. 10 is a block diagram illustrating functions of a pixel gradient calculation unit.

As illustrated in FIG. 10, the pixel gradient calculation unit 31 performs a pixel gradient calculation process that calculates pixel gradients from the medical image. The pixel gradient calculation process preferably is any of, for example, a Sobel filter (extracting edges using first-order derivatives), a Laplacian filter (extracting edges using second-order derivatives), a Log filter (enhancing edges with logarithms), a LoG filter (extracting edges by applying a second-order derivative operator to a smoothing result obtained with a Gaussian function), or a Canny filter (applying a smoothing treatment before taking the derivative to suppress the enhancement and extraction of noise). Pixel gradient data is obtained by the pixel gradient calculation process. In the pixel gradient data, pixels in the edge portions of the region of interest ROI have relatively large pixel gradients, while non-edge portions of the region of interest ROI have relatively small pixel gradients.

The representative value calculation unit 32 calculates a representative value of the pixel gradients. The representative value preferably is the sum or the mean of the pixel gradients in the medical image. The representative value calculated by the representative value calculation unit 32 is a value representing the pixel gradients in the region of interest ROI. For example, in the case where the representative value is higher in proportion to less image blur, a higher representative value indicates that there is no image blur and that the region of interest ROI is distinct, whereas a lower representative value indicates that there is image blur and that the region of interest ROI is indistinct.

Figure 11:
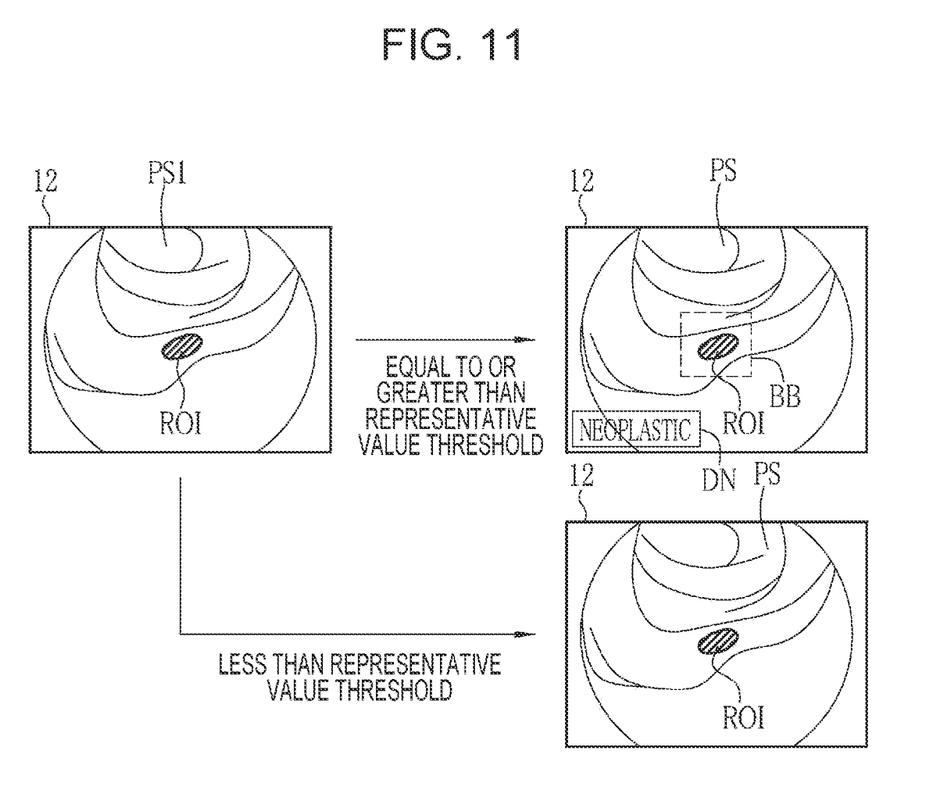
FIG. 11 is an explanatory diagram illustrating display control of a result of a recognition process in the second embodiment.

The second determination unit 33 determines to display or not display the result of the recognition process on the basis of the representative value calculated by the representative value calculation unit 32. For example, in the case where the representative value is higher in proportion to less image blur, as illustrated in FIG. 11, if the representative value is equal to or greater than a representative value threshold, the second determination unit 33 determines that there is no blur, and the display control unit 18 displays, on the display 12, the bounding box BB which is the result of the recognition process and/or the disease name DN of a lesion which is the differentiation result. On the other hand, if the representative value is less than the representative value threshold, the second determination unit 33 determines that there is blur, and the display control unit 18 does not display the bounding box BB and/or the disease name DN of a lesion.

For the medical image, a normal light image obtained by radiating light in the white range or light in multiple wavelength ranges serving as light in the white range can be used.

If an image obtained by radiating light in a specific wavelength range is used as the medical image, a range narrower than the white wavelength range can be used as the specific wavelength range.

For example, the specific wavelength range is the blue range or the green range of the visible range.

In the case where the specific wavelength range is the blue range or the green range of the visible range, the specific wavelength range preferably includes the wavelength range equal to or greater than 390 nm and less than or equal to 450 nm, or equal to or greater than 530 nm and less than or equal to 550 nm, and light in the specific wavelength range has a peak wavelength within the wavelength range equal to or greater than 390 nm and less than or equal to 450 nm, or equal to or greater than 530 nm and less than or equal to 550 nm.

The specific wavelength range is, for example, the red range of the visible range.

In the case where the specific wavelength range is the red range of the visible range, the specific wavelength range preferably includes the wavelength range equal to or greater than 585 nm and less than or equal to 615 nm, or equal to or greater than 610 nm and less than or equal to 730 nm, and light in the specific wavelength range preferably has a peak wavelength within the wavelength range equal to or greater than 585 nm and less than or equal to 615 nm, or equal to or greater than 610 nm and less than or equal to 730 nm.

For example, the specific wavelength range may include a wavelength range where the absorption coefficient differs between oxidized and reduced hemoglobin, and light in the specific wavelength range may have a peak wavelength in a wavelength range where the absorption coefficient differs between oxidized and reduced hemoglobin.

In the case where the specific wavelength range includes a wavelength range where the absorption coefficient differs between oxidized and reduced hemoglobin, and light in the specific wavelength range has a peak wavelength in a wavelength range where the absorption coefficient differs between oxidized and reduced hemoglobin, the specific wavelength range preferably includes the wavelength range of 400±10 nm, 440±10 nm, 470±10 nm, or equal to or greater than 600 nm and less than or equal to 750 nm, and light in the specific wavelength range preferably has a peak wavelength in the wavelength range of 400±10 nm, 440±10 nm, 470±10 nm, or equal to or greater than 600 nm and less than or equal to 750 nm.

In the case where the medical image is an in vivo image of the inside of a living body, the in vivo image may contain information pertaining to fluorescence emitted by a fluorescent substance inside the living body.

Moreover, fluorescence obtained by irradiating the inside of a living body with excitation light having a peak wavelength equal to or greater than 390 nm and less than or equal to 470 nm may be used as the fluorescence.

In the case where the medical image is an in vivo image of the inside of a living body, the wavelength range of infrared light may be used as the specific wavelength range described above.

In the case where the medical image is an in vivo image of the inside of a living body and the wavelength range of infrared light is used as the specific wavelength range described above, the specific wavelength range preferably includes the wavelength range equal to or greater than 790 nm and less than or equal to 820 nm, or equal to or greater than 905 nm and less than or equal to 970 nm, and light in the specific wavelength range preferably has a peak wavelength in the wavelength range equal to or greater than 790 nm and less than or equal to 820 nm, or equal to or greater than 905 nm and less than or equal to 970 nm.

The medical imaging apparatus may have a special light image acquisition unit that acquires, on the basis of a normal light image obtained by radiating light in the white range or light in multiple wavelength ranges serving as light in the white range, a special light image having a signal in a specific wavelength range. In this case, the special light image may be used as the medical image.

A signal in the specific wavelength range may be obtained by operations based on RGB or CMY color information included in the normal light image.

A feature image generation unit may be included. The feature image generation unit generates a feature image through operations based on at least one of a normal light image obtained by radiating light in the white range or light in multiple wavelength ranges serving as light in the white range or a special light image obtained by radiating light in the specific wavelength range. In this case, the feature image may be used as the medical image.

With regard to the endoscope system 100, a capsule endoscope may be used as the endoscope 102. In this case, the light source device 101 and a portion of the endoscope processor device 103 may be mounted in the capsule endoscope.

In the above embodiments and modifications, the hardware structure of a processing unit that executes various processes, such as those of the image acquisition unit 15, the recognition processing unit 16, the recognition result display determination unit 17, the display control unit 18, the intermediate image feature acquisition unit 20, the pattern classification unit 21, the first determination unit 22, the recognition result display determination unit 30, the pixel gradient calculation unit 31, the representative value calculation unit 32, and the second determination unit 33, is any of various types of processors as indicated in the following. The various types of processors include: a central processing unit (CPU), which is a general-purpose processor that executes software (a program or programs) to function as any of various types of processing units; a programmable logic device (PLD) whose circuit configuration is modifiable after fabrication, such as a field-programmable gate array (FPGA); a dedicated electric circuit, which is a processor including a circuit configuration designed for the specific purpose of executing various processes; a graphical processing unit (GPU) that performs massively parallel processing such as image processing, and the like.

A single processing unit may be configured as any one of these various types of processors, but may also be configured as a combination of two or more processors of the same or different types (such as multiple FPGAs, a combination of a CPU and an FPGA, or a combination of a CPU and a GPU, for example). Moreover, multiple processing units may also be configured as a single processor. A first example of configuring multiple processing units as a single processor is a mode in which a single processor is configured as a combination of software and one or more CPUs, as typified by a computer such as a client or a server, such that the processor functions as the plurality of processing units. A second example of the above is a mode utilizing a processor in which the functions of an entire system, including the multiple processing units, are achieved on a single integrated circuit (IC) chip, as typified by a system on a chip (SoC). In this way, various types of processing units are configured as a hardware structure by using one or more of the various types of processors indicated above.

Furthermore, the hardware structure of these various types of processors is, more specifically, circuitry in a mode combining circuit elements such as semiconductor devices.

REFERENCE SIGNS LIST

10 medical imaging apparatus
11 processor device for the recognition process
12 display
15 image acquisition unit
16 recognition processing unit
17 recognition result display determination unit
18 display control unit
20 intermediate image feature acquisition unit
21 pattern classification unit
22 first determination unit
30 recognition result display determination unit
31 pixel gradient calculation unit
32 representative value calculation unit
33 second determination unit
100 endoscope system
101 light source device
102 endoscope
103 endoscope processor device
104 display
DN disease name of lesion
PS medical image
ROI region of interest

What is claimed is:

1. A medical imaging apparatus comprising:
a processor configured to:
sequentially acquire a medical image;
apply a recognition process to the medical image;
determine to display or not display a result of the recognition process on a display according to blur in the medical image; and
control the display of the result of the recognition process according to the determination;
wherein the medical image is an endoscope image obtained through image pick-up by an endoscope inside a body.

2. The medical imaging apparatus according to claim 1, wherein the processor is configured to:
acquire intermediate image features from a time the recognition process is applied to the medical image until the result of the recognition process is obtained;
perform a pattern classification process that classifies patterns of the intermediate image features; and
determine to display or not display the result of the recognition process on a basis of a result of the pattern classification process.

3. The medical imaging apparatus according to claim 2, wherein the recognition process is a convolutional neural network (CNN).

4. The medical imaging apparatus according to claim 2, wherein the pattern classification process is a support vector machine (SVM).

5. The medical imaging apparatus according to claim 1, wherein the processor is configured to:
perform a pixel gradient calculation process that calculates pixel gradients from the medical image;
calculate a representative value of the pixel gradients; and
determine to display or not display the result of the recognition process on a basis of the representative value.

6. The medical imaging apparatus according to claim 5, wherein the pixel gradient calculation process is any of a Sobel filter, a Laplacian filter, a Log filter, a LoG filter, or a Canny filter.

7. The medical imaging apparatus according to claim 5, wherein the representative value is a sum or mean of the pixel gradients in the medical image.

8. The medical imaging apparatus according to claim 1, wherein the processor is configured to acquire, as the medical image, the endoscope image from an endoscope processor device that processes the endoscope image.

9. An operating method for a medical imaging apparatus, the operating method comprising steps, executing by a processor, of:
   sequentially acquiring a medical image;
   applying a recognition process to the medical image;
   determining to display or not display a result of the recognition process on a display according to blur in the medical image; and
   controlling the display of the result of the recognition process according to the determination;
   wherein the medical image is an endoscope image obtained through image pick-up by an endoscope inside a body.

* * * * *